United States Patent [19]
Cunningham et al.

[11] Patent Number: 5,804,352
[45] Date of Patent: Sep. 8, 1998

[54] DYE SOLUTION CONTAINING HINDERED SOLVENT FUNCTIONALITY

[75] Inventors: Michael Paul Cunningham, Rochester; Thomas Michael Smith, Spencerport, both of N.Y.

[73] Assignee: Eastman Kodak Company, Rochester, N.Y.

[21] Appl. No.: 949,698

[22] Filed: Oct. 14, 1997

Related U.S. Application Data

[62] Division of Ser. No. 418,052, Apr. 6, 1995, abandoned.

[51] Int. Cl.⁶ .................................................. G03C 1/73
[52] U.S. Cl. .............................. 430/270.15; 430/270.16; 430/270.18; 430/270.2; 430/270.1; 8/582; 8/607; 8/609; 427/240
[58] Field of Search ........................... 430/270.1, 270.15, 430/270.16, 270.18, 270.2; 8/582, 607, 609; 427/240

[56] References Cited

U.S. PATENT DOCUMENTS

| | | | |
|---|---|---|---|
| 3,954,397 | 5/1976 | Desiderio | 8/607 |
| 3,965,350 | 6/1976 | Molina | 250/302 |
| 4,028,118 | 6/1977 | Nakasuji et al. | 106/21 |
| 4,160,642 | 7/1979 | Desiderio | 8/552 |
| 5,283,094 | 2/1994 | Sasakawa et al. | |
| 5,378,589 | 1/1995 | Sawada et al. | 430/270.17 |

FOREIGN PATENT DOCUMENTS

| | | |
|---|---|---|
| 0 212 907 | 3/1987 | European Pat. Off. . |
| 0 353 393 | 4/1989 | European Pat. Off. . |
| 0 467 716 | 1/1992 | European Pat. Off. . |
| 0 491 951 | 7/1992 | European Pat. Off. . |
| 3835489 | 4/1990 | Germany . |
| 63-158924 | 1/1988 | Japan . |

OTHER PUBLICATIONS

Bschorr et al, CA abstract 113:43472.

*Primary Examiner*—Margaret Einsmann
*Attorney, Agent, or Firm*—John R. Everett

[57] ABSTRACT

A dye solution comprising a laser recordable dye and a solvent for the dye that has (a) a solvent functional group selected from esters, ketones and ethers; and (b) the solvent functional group has as hindering groups (i) at least one t-butyl group on one side thereof or (ii) two groups on opposite sides thereof selected from the group consisting of isoamyl, t-butyl, isobutyl and isopropyl; provided that both groups cannot be isopropyl and (c) the hindering groups are adjacent to the solvent functional group.

5 Claims, No Drawings

DYE SOLUTION CONTAINING HINDERED SOLVENT FUNCTIONALITY

This is a divisional of application Ser. No. 08/418,052, filed Apr. 6, 1995, now abandoned.

FIELD OF INVENTION

The present invention relates to coating solutions for optical recording layers particularly writable compact disk (CD) laser recording layers.

BACKGROUND OF THE INVENTION

Writable CD is currently manufactured by spin coating a laser recording layer from solution onto a transparent (typically polycarbonate) substrate. The quality and performance requirements of the disk are defined in various compact optical disk standards (Orange Book, part II in particular) which demand, among other things, high optical quality for the substrate. Among the features present on the substrate is a continuous spiral groove to provide for tracking.

The spin coating operation can potentially cause difficulties since polycarbonate is susceptible to attack by a wide range of the solvents used in the coating solution. Two major problems observed with known writable CD formulations are haze formation, resulting in overall loss of substrate optical quality, and groove degradation resulting in the reduction or loss of tracking ability.

Experimentally, it is observed that solvents more polar than hydrocarbons and less polar than alcohols (i.e., intermediate polarity) tend to attack and cause haze to occur in a typical CD substrate, exemplified by but not necessarily restricted to polycarbonate. The extent of attack is dependent on the solvent and the amount of time it is in contact with the substrate. Some solvents within the intermediate polarity range do not cause haze on the substrate, but instead tend to attack the grooves on the substrate and degrade the ability to track. In either case, the ultimate result of prolonged attack is that the material becomes unsuitable for use in writable CD's.

To date, no single solvent has been found which satisfies all the criteria desired for high volume manufacture. Non-polar aliphatic hydrocarbon solvents, while affording low substrate attack, do not offer sufficient solubility for many of the polar dye classes currently being investigated for writable CD use. Alcohols, which afford little or no substrate attack, are generally too polar to offer good solubility for the dye classes of interest. Solvents of intermediate polarity with single functionality (i.e., functional group(s) of only one type in the solvent molecule) generally afford good solubility for the recording chemistries of general interest but tend to damage the substrate. Solvents bearing combinations of functional groups in one molecule, of which one of the groups is an OH functionality, appear to be most acceptable, e.g., 4-hydroxy-4-methyl-2-pentanone (carbonyl and OH), ethylene glycol derivatives (ether and OH), and the like.

EP 0,353,393, A2 discloses a coating solution of a cyanine dye dissolved in an organic solvent such as 4-hydroxy-4-methyl-2-pentanone (HMP), or an ether such as glycol monoalkyl ether. However, HMP evaporates very slowly and therefore has a long dry time which is not ideal for coating solvents, while glycol monoalkyl ethers are not generally suitable for manufacturing purposes. The more volatile 2-methoxyethanol and 2-ethoxyethanol are listed in the National Institute for Occupational Safety and Health (NIOSH) subfile and are known to be teratogenic. 2-Butoxyethanol is not teratogenic but is of low vapor pressure and unsuitable for high volume manufacture. Thus it appears that glycol monoalkyl ethers, as a class, are not suitable solvents for coating writable CD recording layers.

What is needed in the art is a useful solvent or solvent combination for spin coating writable CD recording layers. A useful solvent would combine the features of low cost, evaporation rate consistent with high volume manufacture, minimal substrate attack, high solubility for the laser recording chemistry, and minimal health, safety and environmental concerns.

SUMMARY OF THE INVENTION

The present invention provides a dye solution comprising a laser recordable dye and a solvent for the dye that has (a) a solvent functional group selected from esters, ketones and ethers; and (b) the solvent functional group has as hindering groups (i) at least one t-butyl group on one side thereof or (ii) two groups on opposite sides thereof selected from the group consisting of isoamyl, t-butyl, isobutyl and isopropyl; provided that both groups cannot be isopropyl and (c) the hindering groups are adjacent to the solvent functional group.

The solvents used in the dye solution of the invention exhibit minimal attack on recording layer substrates. Solvents of the present invention have been found to be relatively innocuous, cheap, afford excellent salvation power towards the dye classes of general interest, possess an evaporation rate consistent with high volume, high speed coating operations, and offer minimal health, safety and environmental concerns. This discovery was unexpected. The commonly available intermediate polarity solvents (esters, ketones, ethers), which do not contain hindering groups, or contain hindering groups other than those included in the invention, generally cannot be used for the CD application because of severe substrate attack.

DETAILED DESCRIPTION OF THE INVENTION

The solvent functional groups and hindering groups are presented in Table 1.

TABLE 1

| Ester group | Ketone group | Ether group |
| --- | --- | --- |
| t-Butyl acetate | t-Butyl methyl ketone | Diisobutyl ether |
| t-Butyl propionate | Diisobutyl ketone ✓ | |
| isoPropyl isobutyrate | | |
| isoButyl isobutyrate | | |
| Ethyl pivalate | | |

The dye solution of the present invention comprises a laser recordable dye dissolved in an organic solvent. The term "laser recordable dye" as used herein means a dye which, under laser illumination, undergoes chemical or physical changes of sufficient magnitude to be read out by the same or another laser. Such dyes are commonly used in optical recording elements including writable CD elements.

Examples of laser recordable dyes include, but are not limited to, indoaniline dyes (for example, those described in EP 192-778-B), cyanine dyes, phthalocyanine dyes, (for example, those described in U.S. Pat. No. 5,080,946), azo dyes (for example, those described in WO 9114-740-NF), metallized azo dyes and metallized formazan dyes. A general list of such dyes is also disclosed in EPO-353-393 A2. The dye solution of the invention is particularly suitable for coating on a substrate to provide a recording layer of a writable CD.

The advantageous properties of a coating solution within the present invention are retained when part of the solvent of the invention is replaced by a non hindered solvent such as an alcohol. Lower ($C_1$ to $C_4$) alcohols like methanol, ethanol, propanol and butanol are useful. The added amount of these additional solvents should be less than about 50% by weight, preferably less than about 30%, most preferably about 5 to 20%. Accordingly, the solvent or solvent mixture in the dye solution of this invention contains between 50 and 100% by weight of hindered solvent. In most cases, it is expedient to employ only a solvent of the invention.

The dye solutions of this invention advantageously contain 1 to 10 weight percent of a laser recordable dye and 99 to 90 weight percent of the hindered solvent or solvent mixture mentioned above. The preferred range is 1 to 7 weight percent of the dye and 99 to 93 weight percent of the solvent. Especially preferred is 2 to 4 weight percent of the dye and 98 to 96 weight percent of the solvent. All weight percents are based on total solids.

Besides the dyes and solvents specified above, various additives may be added to the dye solution used in the present invention, depending on the properties desired in individual cases. Optional additives include, for example, surfactants, stabilizers, and adhesion promoters. Although the amount of these additives varies depending on the properties desired, it is usually about 0.1 to about 5 weight percent based on total solids.

The dye solution of the present invention preferably has the following composition:

1 to 10 weight percent of a laser recordable dye, preferably a metal complex dye;

99 to 90 weight percent of hindered solvent or mixtures thereof and, if desired, one or more of the above listed optional additives.

The dye solution of the invention is prepared by first dissolving a laser recordable dye in hindered solvent or hindered solvent mixtures and stirring for about 30 minutes. The solution is then passed through a 0.2 micron filter. The optional additives listed above may be added to the solution.

The invention is illustrated by the following examples.

Example 1

A series of common ester solvents were tested by applying 2 mls of the solvents to a grooved polycarbonate substrate while the substrate was spun at 600 rpm. Diffractometry was used to compare the groove depths, as a function of radius, before and after treatment and the data summarized in Table 2.

TABLE 2

| Radius (mm) | 25.0 | 30.0 | 35.0 | 40.0 | 45.0 | 50.0 | 55.0 |
|---|---|---|---|---|---|---|---|
| | | | Groove depth (nm) | | | | |
| untreated | 138.5 | 139.9 | 138.2 | 138.2 | 135.0 | 137.0 | 131.7 |
| n-propyl propionate | 2.8 | 2.6 | 2.2 | 2.3 | 1.4 | 1.6 | 2.9 |
| n-butyl propionate | 4.0 | 2.9 | 3.1 | 2.0 | 2.0 | 1.6 | 2.3 |
| n-propyl butyrate | 8.2 | 6.4 | 4.9 | 4.7 | 4.5 | 3.8 | 3.4 |
| *t-butyl propionate | 138.6 | 140.2 | 139.1 | 138.8 | 135.7 | 134.7 | 136.2 |
| methyl isobutyrate | 11.5 | 1.2 | 0.5 | 1.5 | 0.8 | 0.5 | 1.6 |

TABLE 2-continued

| Radius (mm) | 25.0 | 30.0 | 35.0 | 40.0 | 45.0 | 50.0 | 55.0 |
|---|---|---|---|---|---|---|---|
| | | | Groove depth (nm) | | | | |
| ethyl isobutyrate | 13.0 | 9.5 | 7.6 | 6.8 | 6.4 | 5.6 | 5.3 |
| n-propyl isobutyrate | 116.8 | 79.9 | 67.4 | 59.7 | 51.9 | 43.5 | 36.3 |
| *isopropyl isobutyrate | 135.4 | 136.4 | 134.3 | 134.5 | 131.1 | 131.7 | 124.7 |
| s-butyl acetate | 14.7 | 11.2 | 9.5 | 8.6 | 7.9 | 7.7 | 7.2 |
| n-butyl acetate | 3.0 | 2.9 | 2.0 | 2.3 | 1.7 | 2.1 | 2.7 |
| isobutyl acetate | 12.9 | 8.8 | 6.4 | 5.5 | 5.2 | 5.0 | 5.2 |
| ethyl butyrate | 3.8 | 1.4 | 1.9 | 1.6 | 1.9 | 2.4 | 3.3 |
| butyl butyrate | 71.9 | 15.2 | 12.8 | 11.5 | 10.5 | 10.4 | 10.3 |
| isopropyl butyrate | 137.0 | 107.5 | 136.9 | 122.0 | 104.7 | 88.3 | 72.8 |
| isobutyl propionate | 137.1 | 137.2 | 58.1 | 25.1 | 18.8 | 16.1 | 14.4 |
| *isobutyl isobutyrate | 137.3 | 137.3 | 134.6 | 134.3 | 131.1 | 133.2 | 130.3 |
| *t-butyl acetate | 137.7 | 137.9 | 135.6 | 135.2 | 132.1 | 133.0 | 127.6 |
| methyl pivalate | 127.3 | 125.3 | 121.8 | 121.1 | 117.8 | 118.3 | 113.8 |
| *ethyl pivalate | 134.4 | 136.0 | 134.8 | 135.1 | 132.1 | 132.8 | 123.6 |

*These solvents are within the scope of the invention.

The table compares the effects of the solvents within the invention to solvents outside of the invention. The data shows that the hindering groups of the invention prevent substrate attack. Solvents containing hindering groups outside of the invention or no hindering groups result in significant attack on the substrate.

Example 2

The experiment described above was repeated using a series of common ketone solvents and afforded the data shown as Table 3.

TABLE 3

| Radius (mm) | 25.0 | 30.0 | 35.0 | 40.0 | 45.0 | 50.0 | 55.0 |
|---|---|---|---|---|---|---|---|
| | | | Groove depth (nm) | | | | |
| untreated | 137.8 | 138.9 | 137.4 | 137.2 | 134.1 | 135.2 | 130.1 |
| diisopropyl ketone | 78.6 | 61.4 | 47.5 | 40.5 | 36.3 | 32.3 | 27.5 |
| *diisobutyl ketone | 136.4 | 137.1 | 135.3 | 135.0 | 132.1 | 134.4 | 131.4 |
| di-n-propyl ketone | 6.9 | 4.2 | 3.7 | 3.4 | 4.1 | 4.0 | 4.2 |
| 2-methylbutyl ethyl ketone | 75.2 | 59.5 | 54.6 | 49.7 | 43.8 | 36.7 | 30.0 |
| *t-butyl methyl ketone | 135.7 | 135.5 | 133.6 | 133.4 | 130.9 | 133.0 | 130.7 |

*These solvents are within the scope of the invention.

Again, solvents bearing at least one t-butyl group or at least two isobutyl groups were effective in preventing groove attack while unhindered solvents resulted in groove destruction.

Example 3

The above experiment was repeated with a hindered ether solvent and the data summarized in Table 4.

TABLE 4

| Radius (mm) | 25.0 | 30.0 | 35.0 | 40.0 | 45.0 | 50.0 | 55.0 |
|---|---|---|---|---|---|---|---|
| | | | Groove depth (nm) | | | | |
| untreated | 146.7 | 146.9 | 147.2 | 147.1 | 147.1 | 146.5 | 144.8 |
| *diisobutyl ether | 146.1 | 146.5 | 146.8 | 147.1 | 146.7 | 146.0 | 144.2 |

*This solvent is within the scope of the invention.

The data show no significant attack by the hindered ether upon the substrate.

Example 4

The solvents of Tables 2, 3 and 4 were used to coat a phthalocyanine dye used in writeable CD optical recording elements on a typical grooved substrate. In each case 3% solutions of the phthalocyanine dye gave spin coatings of high optical quality.

The invention has been described in detail with particular reference to preferred embodiments thereof, but it will be understood that variations and modifications can be effected within the spirit and scope of the invention.

What is claimed is:

1. A method of coating an optical recording layer, comprising the steps of:

providing a transparent substrate comprising a continuous spiral groove;

providing a dye solution comprising a laser recordable dye and a solvent for the dye that has (a) a solvent functional group selected from esters, ketones and ethers; and (b) the solvent functional group has as hindering groups (i) at least one t-butyl group on one side thereof or (ii) two groups on opposite sides thereof selected from the group consisting of isoamyl, t-butyl and isopropyl; provided that both groups cannot be isopropyl and (c) the hindering groups are adjacent to the solvent functional group; spin coating the dye solution on the substrate and evaporating said solvent.

2. The method of claim 1 wherein the dye solvent is selected from the group consisting of t-butyl acetate, t-butyl propionate, isopropyl isobutyrate, isobutyl isobutyrate, ethyl pivalate, and t-butyl methyl ketoneo.

3. The method of claim 1 wherein the laser recordable dye is selected from the group consisting of fomrazan, indoaniline, cyanine, azo, and phthalocyanine dyes.

4. The method of claim 1 wherein the dye is a phthalocyanine dye.

5. A method of forming an optical recording layer, comprising the steps of:

providing a transparent substrate comprising a continuous spiral groove;

providing a dye solution of a laser recordable dye and a solvent for the dye which is isobutyl isobutyrate;

spin coating the dye solution onto the substrate and evaporating the solvent.

* * * * *